US012743342B2

(12) United States Patent
Banerjee et al.

(10) Patent No.: US 12,743,342 B2
(45) Date of Patent: Sep. 22, 2026

(54) ARTIFICIAL INTELLIGENCE DATA PLATFORM

(71) Applicant: NetApp, Inc., San Jose, CA (US)

(72) Inventors: Arindam Banerjee, Pleasanton, CA (US); Kiran Srinivasan, Los Gatos, CA (US); Leela Shankar Tamma, San Ramon, CA (US); Atul Ramesh Pandit, Los Gatos, CA (US); Ardalan Kangarlou, Cary, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/232,249

(22) Filed: Jun. 9, 2025

(65) Prior Publication Data

US 2026/0079796 A1 Mar. 19, 2026

Related U.S. Application Data

(60) Provisional application No. 63/801,241, filed on May 7, 2025, provisional application No. 63/773,033, filed on Mar. 17, 2025, provisional application No. 63/750,030, filed on Jan. 27, 2025, provisional application No. 63/712,080, filed on Oct. 25, 2024, provisional application No. 63/695,621, filed on Sep. 17, 2024.

(51) Int. Cl.

| | |
|---|---|
| ***G06F 11/1446*** | (2026.01) |
| ***G06F 16/22*** | (2019.01) |
| ***G06F 16/3329*** | (2025.01) |

(52) U.S. Cl.

CPC ...... *G06F 11/1451* (2013.01); *G06F 16/2237* (2019.01); *G06F 16/3329* (2019.01); *G06F 2201/84* (2013.01)

(58) Field of Classification Search

CPC ............. G06F 11/1451; G06F 16/2237; G06F 16/3329

See application file for complete search history.

(56) References Cited

U.S. PATENT DOCUMENTS

| | | | | |
|---|---|---|---|---|
| 6,654,771 | B1 * | 11/2003 | Parham | G06F 16/2365 |
| 7,904,466 | B1 | 3/2011 | Valencia et al. | |
| 8,078,653 | B1 | 12/2011 | Bisson et al. | |
| 9,015,123 | B1 | 4/2015 | Mathew et al. | |
| 2021/0240657 | A1 * | 8/2021 | Kumar | G06F 11/1451 |
| 2024/0176709 | A1 * | 5/2024 | A | G06F 16/125 |
| 2024/0370339 | A1 * | 11/2024 | Statton | G06F 16/2237 |
| 2025/0094400 | A1 * | 3/2025 | Mishra | G06F 16/2246 |
| 2025/0342179 | A1 * | 11/2025 | Gangumalla | G06F 16/31 |

* cited by examiner

*Primary Examiner* — Tony Wu

(57) ABSTRACT

The disclosure describes artificial intelligence (AI) data platform that utilizes snapshots obtained from a storage node to update a vector database. The AI data platform compares snapshots to generate differential snapshots that identify changed data in storage volumes. The AI data platform uses the differential snapshots to update vector embeddings in a vector database for retrieval-augmented generation (RAG) workflows.

20 Claims, 9 Drawing Sheets

File 1
Block Pointers
A, B, C

File 2
Block Pointers
D, E

File 3
Block Pointers
G, H, I

Snapshot-1 310

File 1
Block Pointers
A, B, C

File 2
Block Pointers
D, E1, J

File 4
Block Pointers
K, L

Snapshot-2 320

Differential Snapshot
File 2: Modified
File 3: Deleted
File 4: Added
330

Retrieved Metadata
File 2: Metadata
File 4: Metadata
340

Metadata
File Size
Date Created
Date Modified
File Path
Data Category
File Owner / Group
Permissions
File Type
Other Attributes

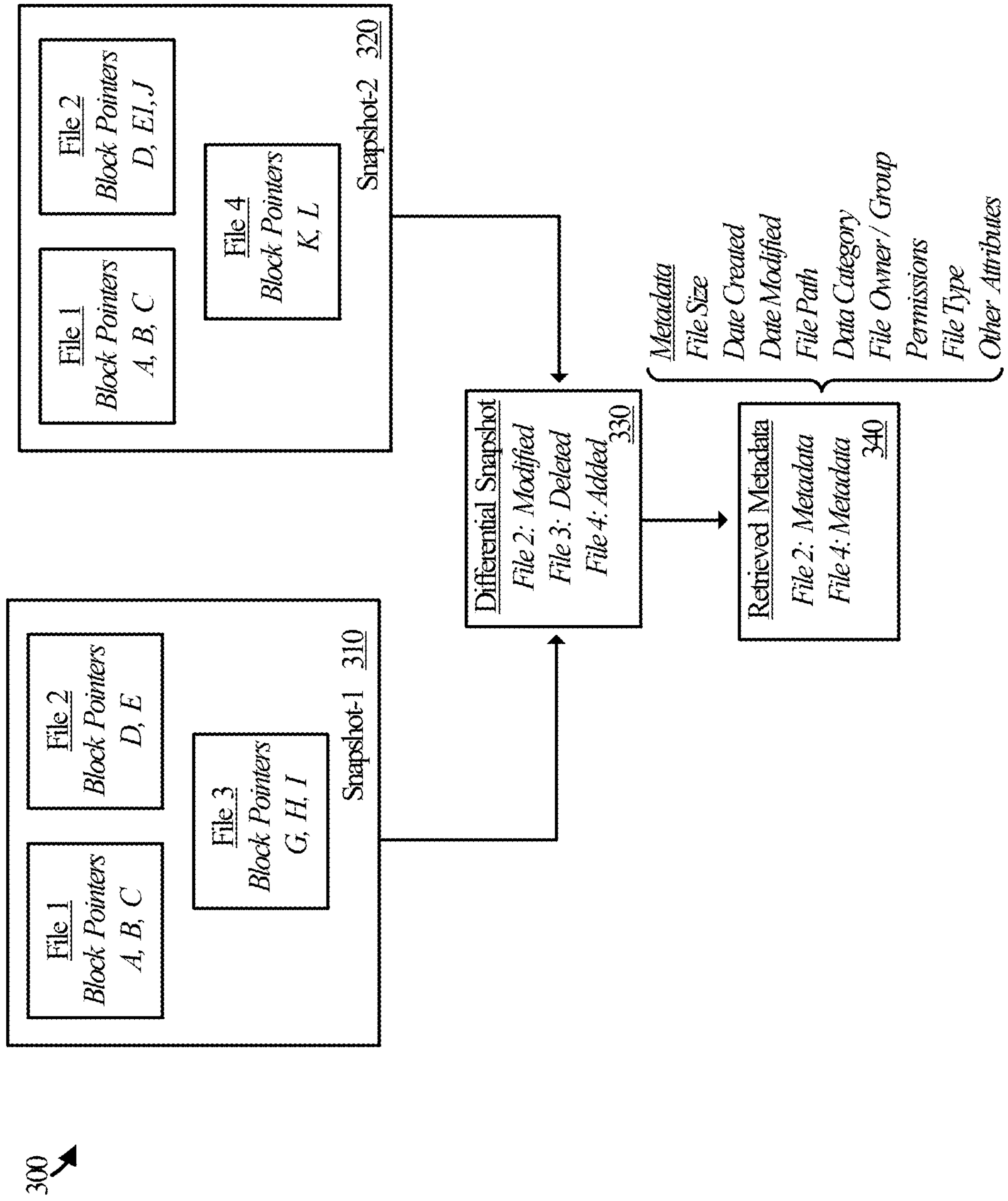

Fig. 3

GAI MODEL 180

APPLICATION 160

STORAGE CLIENT 101

STORAGE NODE 120

AGGREGATED STORAGE 150

AI DATA MANAGEMENT NODE 110

VECTOR DATABASE 163

*write requests*

*write requests*

*snapshot*

*generate and process differential snapshot*

*vector database update*

*user text query*

*user text query*

*similarity search*

*selected vectors*

*identify data objects for selected vectors*

*data object request*

*read data object*

*data object*

*generate prompt with object content*

*prompt*

*response*

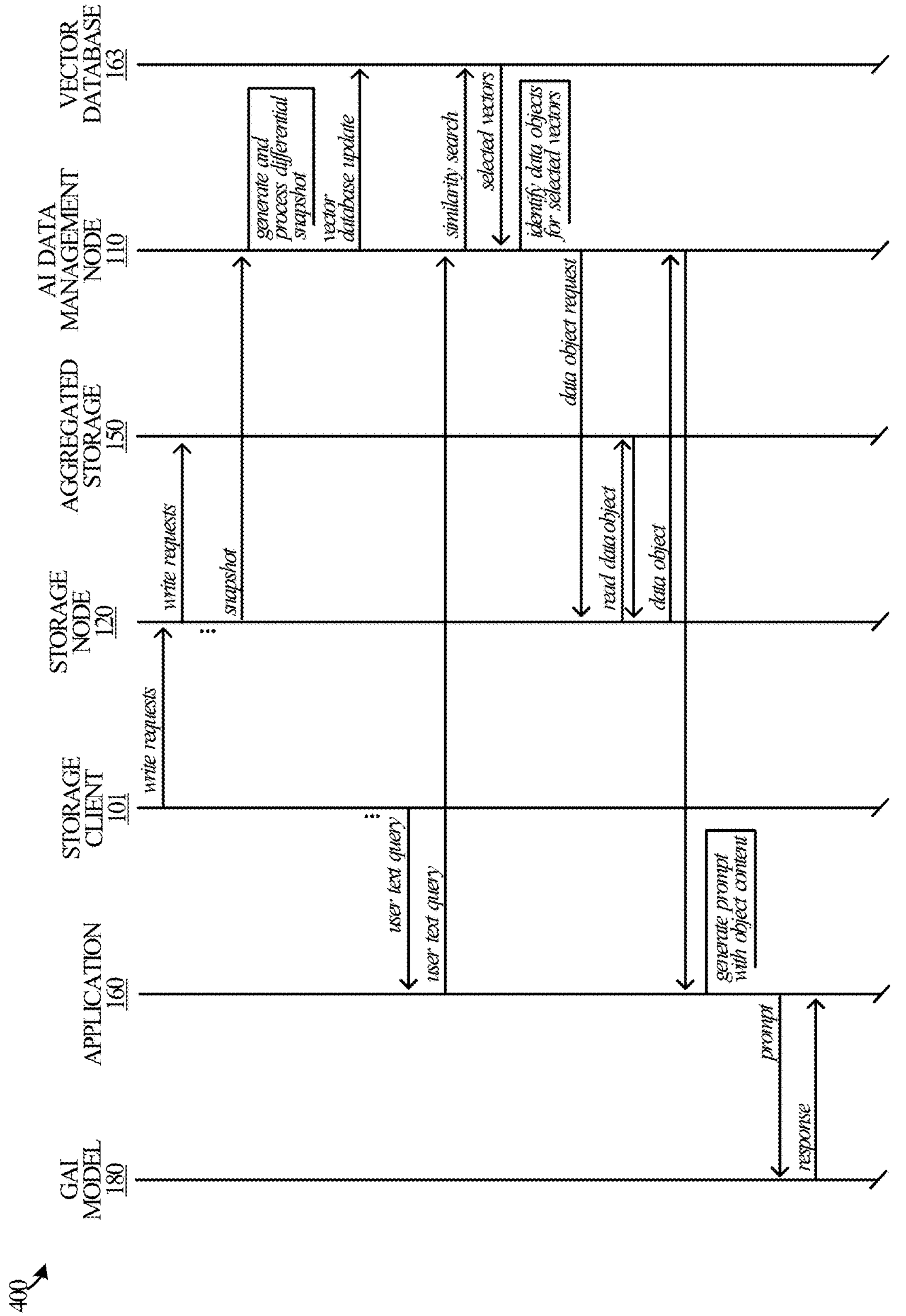

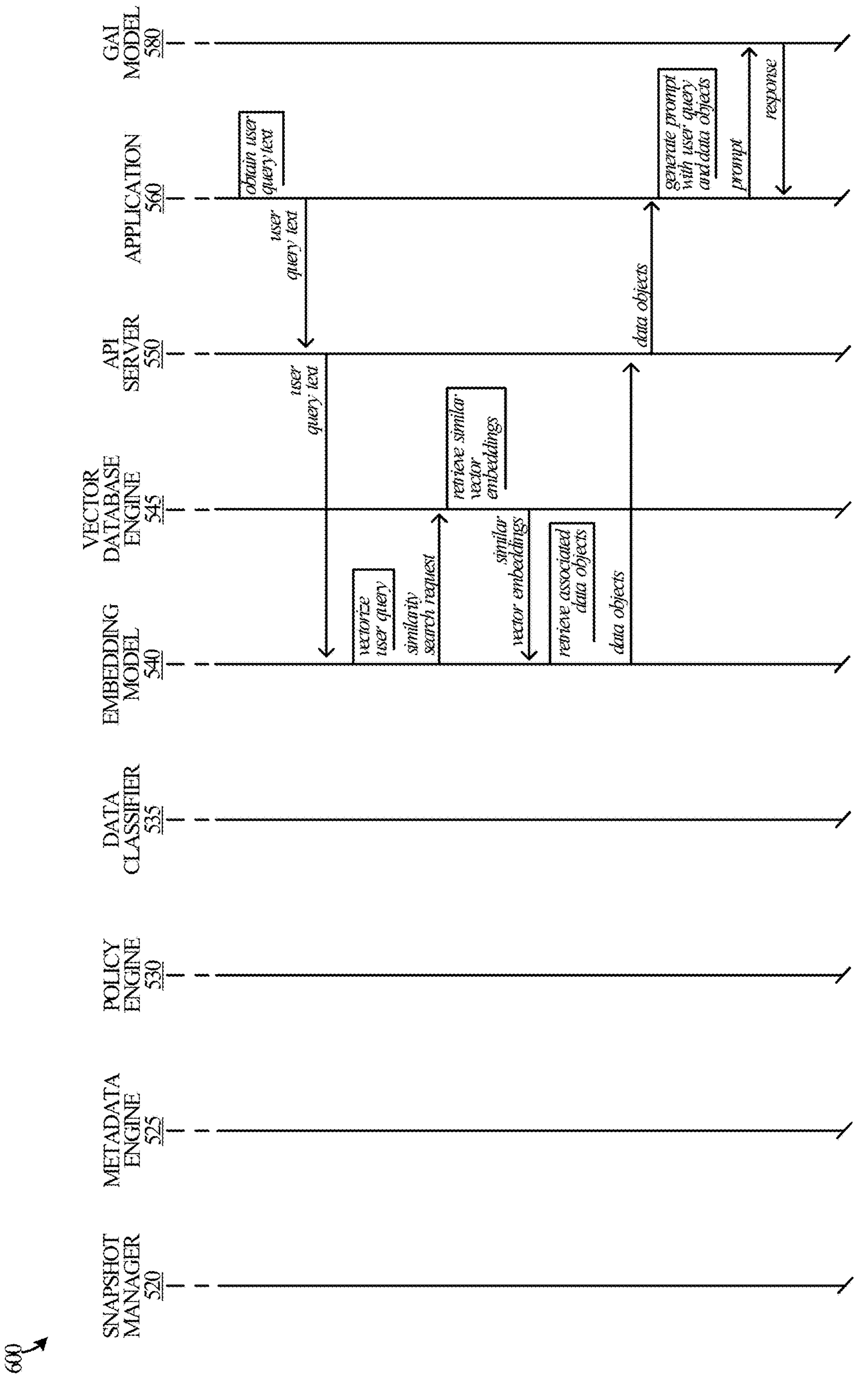
(continued from Fig 6A)
Fig. 6B

ARTIFICIAL INTELLIGENCE DATA PLATFORM

CROSS REFERENCE TO RELATED APPLICATIONS

This application claims priority to U.S. Provisional Ser. No. 63/801,241 titled "ARTIFICIAL INTELLIGENCE DATA PLATFORM," filed May 7, 2025, the contents of which are incorporated by reference in its entirety for all purposes.

This application claims priority to U.S. Provisional Ser. No. 63/773,033 titled "ARTIFICIAL INTELLIGENCE DATA PLATFORM," filed Mar. 17, 2025, the contents of which are incorporated by reference in its entirety for all purposes.

This application claims priority to U.S. Provisional Ser. No. 63/750,030 titled "DATA MANAGEMENT," filed Jan. 27, 2025, the contents of which are incorporated by reference in its entirety for all purposes.

This application claims priority to U.S. Provisional Ser. No. 63/712,080 titled "DATA MANAGEMENT," filed Oct. 25, 2024, the contents of which are incorporated by reference in its entirety for all purposes.

This application claims priority to U.S. Provisional Ser. No. 63/695,621 titled "DATA MANAGEMENT," filed Sep. 17, 2024, the contents of which are incorporated by reference in its entirety for all purposes.

TECHNICAL FIELD

This application relates generally to artificial intelligence data platforms, and more specifically to computing technology for updating a retrieval-augmented generation (RAG) database based on differential snapshots in a local data cluster.

BACKGROUND

Organizations are increasingly leveraging data to power artificial intelligence (AI) workflows, including retrieval-augmented generation (RAG), inferencing, and model training. AI-driven applications involve large-scale data processing to generate insights, automate decision-making, and enhance operational efficiency. Many organizations rely on cloud-based or hybrid data storage solutions to store data. The process of making stored data AI-ready for AI applications often involves transferring data outside the storage environment for preprocessing, transformation, and vectorization. This introduces inefficiencies, security risks, and operational overhead.

AI applications typically need recent data for updating training models and processing. This can be challenging, especially for dynamic environments where data is constantly changing. Traditional AI data pipelines often rely on periodic transfers of large amounts of data, which can introduce delays in synchronizing data updates in the storage cluster with updates to AI data systems. This means AI applications may operate on stale or outdated data. Furthermore, transferring large datasets between storage and AI systems is resource-intensive and leads to multiple redundant copies of the same data being stored across different systems. Organizations may create several duplicate versions of the same dataset to support various AI workflows, consuming significant bandwidth, storage capacity, and compute resources. Additionally, data security and compliance risks arise when transferring sensitive data across multiple systems, as security policies and access controls are reconfigured for each destination. This increases the risk of inconsistent policy enforcement, compliance violations, and potential data exposure.

Organizations also struggle with operational complexity when managing separate data storage and AI processing environments. Administrators and technical staff must be trained to use multiple systems, including data storage platforms, AI model training environments, and inferencing pipelines. This not only increases administrative overhead but also requires cross-platform expertise, resulting in fragmented workflows, increased cost, and slower AI innovation.

SUMMARY

The disclosure describes a system integrating a data storage platform with an artificial intelligence data platform. The system includes aggregated storage with a data volume. The system further includes a storage node configured to read and write data to the data volume. The storage node is further configured to generate a snapshot of the data volume. The system further includes an artificial intelligence (AI) data management node configured to obtain the snapshot from the storage node. The AI data management node is further configured to generate a differential snapshot based on the snapshot and a previous snapshot of the volume. The differential snapshot identifies changed data in the volume. The AI data management node is further configured to process the differential snapshot to update a vector database for retrieval augmented generation. The system integrates data storage functions with AI data processing functions without using external data transfers. Further, the system provides for data "freshness" in AI platforms without having to transfer entire datasets by using differential snapshots, alleviating the above-described issues.

BRIEF DESCRIPTION OF THE DRAWINGS

FIG. 3 illustrates a snapshot processing scenario in an implementation.

FIG. 4 illustrates an operational sequence in an implementation.

FIGS. 6A and 6B illustrate another operational sequence in an implementation.

DETAILED DESCRIPTION

Figure 1:
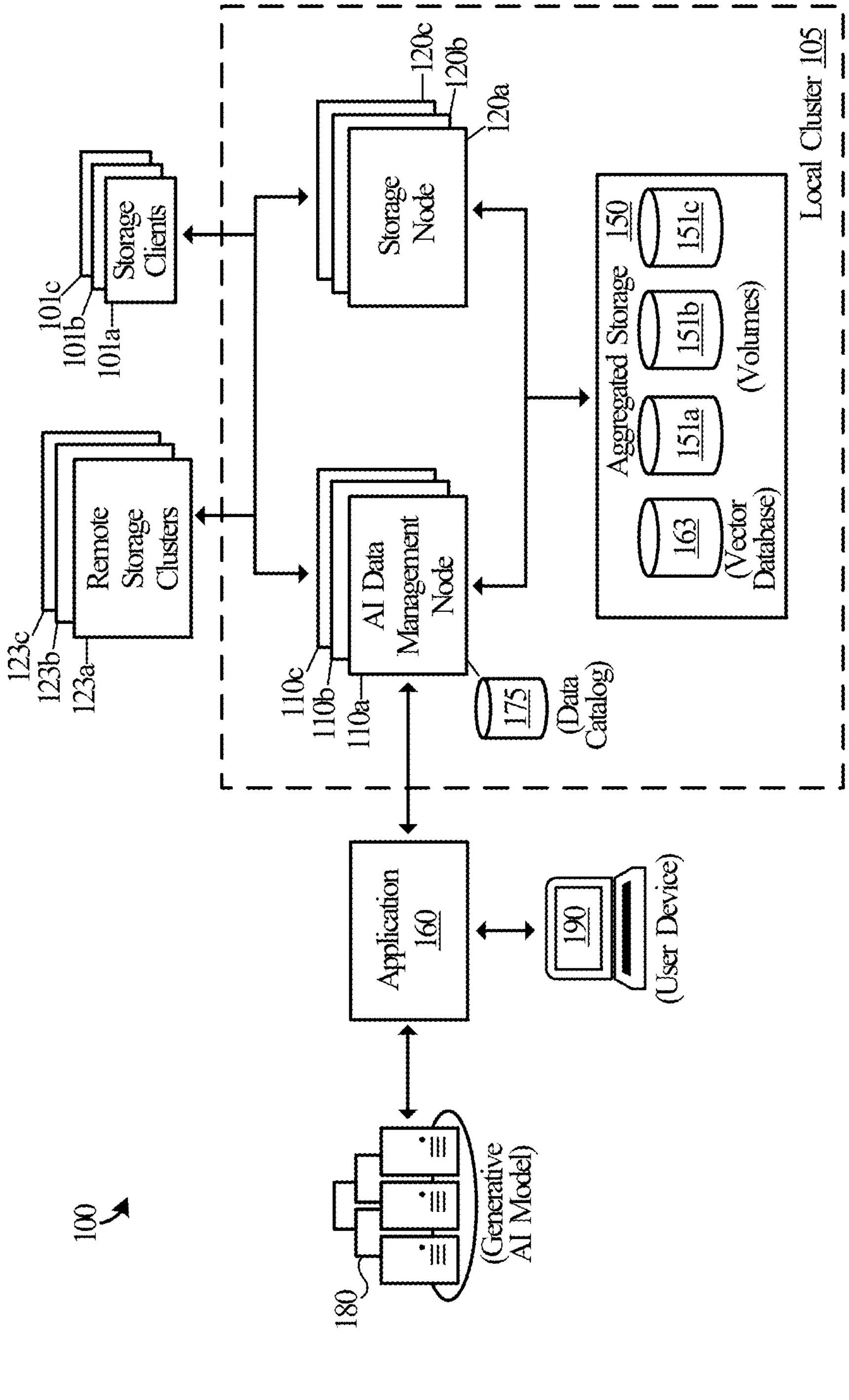
FIG. 1 illustrates a data environment in an implementation.

The present disclosure describes an artificial intelligence (AI) data platform that unifies storage and AI processing within a single cluster environment, reducing the inefficiencies, risks, and overhead associated with traditional AI data pipelines. In existing systems, organizations extract and replicate large volumes of data from storage platforms to external services for classification, embedding, and inference. This results in redundant data copies, fragmented governance, and significant operational burden. In contrast, the system described herein performs AI data preparation in-place, inside the same cluster where the data resides.

Specifically, the described system includes a storage node and an AI data management node, both operating within the same local cluster and accessing the same underlying aggregated storage. The storage node manages data volumes and periodically generates point-in-time snapshots that reflect the file system layout and content of the volumes. These snapshots are provided to the AI data management node, which compares snapshots to identify file-level changes (new files, modified files, and deletions) via differential analysis. The result is a differential snapshot that facilitates fine-grained AI updates without reprocessing or transferring full datasets.

The AI data management node uses this differential snapshot to selectively update a vector database that supports AI workflows such as retrieval-augmented generation (RAG), inferencing, and model training. When the differential snapshot indicates that a file has been deleted, the corresponding vector embedding is removed from the vector database. For new or modified files, the AI data management node retrieves file metadata and evaluates one or more administrator-defined policies to determine whether to vectorize the data. These policies may reference file attributes such as path, ownership, and creation timestamp, for example, providing rule-based control over vector database updates.

Because the AI data management node operates within the same cluster and security domain as the storage node, it has direct access to the underlying file system, data volumes, and access control structures, without exporting or duplicating the data. File reads, metadata analysis, and vector embedding operations are performed directly against the primary storage, using internal interfaces and shared authentication contexts. This reduces the need for external pipelines, minimizes the number of data copies, and preserves compliance with existing storage policies.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of an AI data management platform; 2) non-routine and unconventional operations for updating a vector database for retrieval augmented generation 3) dynamic modification of vector embeddings in a vector database 4) non-routine and unconventional use of differential snapshots of data volumes and/or 5) distributed storage systems with unconventional components configured to implement AI data processing. For example, the AI data platform described herein achieves increased computing efficiency by using differential snapshots to update a vector database rather than transferring entire datasets to external systems.

FIG. 1 illustrates data environment 100 in an implementation. Data environment 100 includes storage clients 101*a*, 101*b*, 101*c*, AI data management nodes (may also be referred to as "compute nodes") 110*a*, 110*b*, 110*c*, storage nodes 120*a*, 120*b*, 120*c*, aggregated storage 150, remote storage clusters 123*a*, 123*b*, 123*c*, application 160, user device 190, and Generative Artificial Intelligence (GAI) model 180. It is noted that while FIG. 1 illustrates certain elements, data environment 100 may include additional or different elements not listed here for clarity.

In data environment 100, storage nodes 120*a*, 120*b*, 120*c* (collectively, storage nodes 120) manage read and write operations to data volumes 151*a*, 151*b*, 151*c* (collectively, data volumes 151) within aggregated storage 150. The read and write operations may be initiated by storage clients 101*a*, 101*b*, 101*c* (collectively, storage clients 101). AI data management nodes 110*a*, 110*b*, 110*c* (collectively, AI data management nodes 110) process data within aggregated storage 150 to make it AI-ready, as further detailed below.

To facilitate AI data processing, storage nodes 120 generate snapshots (capturing the file system state) and provide these snapshots to AI data management nodes 110. This approach allows AI data management nodes 110 to process only the updated data, significantly reducing bandwidth, storage costs, and latency compared to traditional methods that require transferring entire datasets to external AI processing systems. AI data management nodes 110 may operate within the same security domain as the storage nodes 120 and aggregated storage 150, allowing AI data management nodes 110 to enforce access controls and security policies used by the storage nodes 120 without requiring reconfiguration. This reduces the risks associated with data exposure when compared to external AI platforms.

AI data management nodes 110, storage nodes 120, and aggregated storage 150 operate together within local cluster 105. Local cluster 105 provides a unified infrastructure in which both traditional storage operations and AI data processing functions are performed using a common storage pool (i.e., aggregated storage 150). AI data management nodes 110 access the same underlying data volumes 151 as storage nodes 120, reducing redundant data transfers. Components within local cluster 105 operate inside a shared security perimeter, allowing AI data management nodes 110 to inherit and enforce the same access controls, security policies, and compliance frameworks as the storage nodes 120. This tight integration of AI and storage within a single operational and security domain provides data governance continuity while providing efficient, in-place AI workflows.

Storage clients 101 are computing devices that can access storage space in aggregated storage 150 via storage nodes 120. Storage clients 101 can be the entire system of a company, a department, a project unit or any other entity. Each storage client 101 is uniquely identified and, optionally, may also be a part of a logical structure called a storage tenant.

Storage nodes 120 are computing elements responsible for managing read, write, and snapshot operations in aggregated storage 150, along with other storage management functions. In various implementations, storage nodes 120 may be deployed as physical computing devices, virtual machines (VMs), or cloud-based instances.

Storage nodes 120 are representative of control devices or systems that include one or more processing devices capable of controlling, managing, and accessing aggregated storage 150. Examples of the processing devices may include one or more central processing units (CPUs), general purpose processors, Application Specific Integrated Circuits (ASICs), microcontroller units (MCUs), digital signal processors (DSPs), field-programmable gate arrays (FPGAs), and the like.

In various examples, storage nodes 120 are configured to run an instance of a storage operating system to perform the read and write operations received from storage clients 101. Storage nodes 120 can perform read and write operations using a WAFL (Write Anywhere File Layout) type file system whereby storage nodes 120 determine a location at which to write data associated with write operations on-thefly based on metadata indicative of available storage. It is noteworthy that the adaptive aspects of the disclosed technology are not limited to any particular type of file system.

To protect data in aggregated storage 150, storage nodes 120 take snapshots of volumes 151 (point-in-time copies capturing the file system state) and store the snapshots in persistent storage. These snapshots may be captured periodically, and may be triggered by events in various implementations. Storage nodes 120 transmit the snapshots (including metadata describing file system layout) to AI data management nodes 110 for downstream AI workflows. Upon receipt, AI data management nodes 110 may generate differential snapshots by comparing successive snapshots to identify data changes. In some implementations, storage nodes 120 may alternatively or additionally generate the differential snapshots and transmit those directly to AI data management nodes 110.

Aggregated storage 150 is representative of a pooled set of physical storage resources (such as HDDs or SSDs) managed by storage nodes 120. Storage nodes 120 manage the provisioning and organization of aggregated storage 150. Aggregated storage 150 provides physical resources for persistently storing data of volumes 151 and vector database 163.

Volumes 151 are logical storage containers implemented in the physical storage resources of aggregated storage 150 that provide structured storage for user data, application data, and AI-related datasets. Storage nodes 120 allocate and manage volumes 151, which serve as the storage location for structured and unstructured data, including files, objects, and database records.

Vector database 163 is a database for storing vector embeddings generated by AI data management nodes 110 for RAG and inferencing tasks. AI data management nodes 110 generate these vector embeddings by vectorizing data stored in volumes 151. Vector database 163 may be implemented as a distinct logical storage entity or as part of one or more volumes 151, depending on the configuration. A vector embedding serves as a numerical representation of the underlying data, capturing semantic relationships, patterns, and contextual meaning. Vector embeddings enable AI systems to perform semantic similarity searches, retrieving relevant information for retrieval augmented generation and inferencing.

AI data management nodes 110 are representative of computing elements configured for managing AI workflows, including data processing, generation of vector embeddings, and retrieval of vector embeddings for application 160. AI data management nodes 110 may be implemented in physical computing devices, Virtual Machines (VMs), or a Kubernetes deployment, depending on the system architecture. AI data management nodes 110 maintain vector database 163 for RAG and inferencing tasks.

AI data management nodes 110 process snapshots received from storage nodes 120 to identify changes in data volumes 151. In some implementations, AI data management nodes 110 compare successive snapshots to generate differential snapshots internally, identifying modifications, additions, or deletions of files and data objects. This comparison may include both structural metadata (e.g., file path and timestamps) and low-level block mappings. In alternate implementations, storage nodes 120 may generate the differential snapshots themselves and transmit them to AI data management nodes 110, reducing compute overhead at the AI layer. In either case, differential snapshots serve as the basis for efficient AI data preparation workflows by isolating only those data elements that have changed, thereby avoiding redundant processing of unchanged data.

The differential snapshots track and identify changes within volumes 151, capturing modifications. These modifications may include newly created files or data objects, modifications to existing files or data objects, and deleted files or data objects. Instead of capturing an entire dataset, the differential snapshots include only the differential changes since the last snapshot or differential snapshot. The differential snapshots may include content-level changes that modify specific data blocks within files.

AI data management nodes 110 process the differential snapshots to update vector database 163. These updates may include modifying an existing vector embedding in vector database 163, adding a new vector embedding to vector database 163, or deleting a vector embedding from vector database 163, depending on the nature of the differential snapshot.

When a differential snapshot identifies a modification to an existing file or data object, AI data management node 110 processes the differential snapshot to update the corresponding vector embedding in vector database 163. The update provides that the embedding remains aligned with the latest version of the modified data.

Updating an existing vector embedding may involve a series of processing steps to provide that the modified data remains accurately represented in vector database 163. When AI data management node 110 receives a differential snapshot indicating a change in a file or data object, AI data management node 110 may either replace the existing vector with a newly generated vector or incrementally adjust the existing vector representation to reflect minor modifications while preserving contextual meaning. After updating the vector embedding, AI data management node 110 updates the embedding within vector database 163, providing that future similarity searches return results that reflect the latest version of the data.

When a differential snapshot includes a new file or data object, AI data management node 110 generates a new vector embedding for the newly added data and adds it to vector database 163 for use in RAG and inferencing workflows.

When a differential snapshot indicates that a file or data object has been deleted from volume 151, AI data management node 110 removes the corresponding vector embedding from vector database 163 such that outdated or inaccessible data is not used in AI processing.

Data catalog 175 is a structured index of data objects stored in aggregated storage 150, providing a centralized view of available datasets. AI data management node 110 generates data catalog 175 by analyzing metadata associated with data objects in aggregated storage 150, allowing for efficient organization and retrieval. Data catalog 175 may be stored internally within AI data management node 110 or externally in a system such as aggregated storage 150, depending on configuration and storage policies.

AI data management nodes 110 receive queries from application 160 and perform similarity searches in vector database 163 to identify relevant vector embeddings. These embeddings correspond to data objects stored in volumes 151, which AI data management nodes 110 retrieve and provide to application 160. This retrieval process provides for retrieval-augmented generation (RAG) by supplying contextually relevant data for AI-driven query augmentation.

AI data management node 110 also provides an interface for storage clients 101, enabling them to view and browse data catalog 175 and select specific datasets (e.g., collections of files or data objects) for AI processing. Interaction between AI data management node 110 and storage clients 101 may occur via an API (application programming interface) of AI data management node 110. In some implementations, AI data management node 110 only executes AI-driven data processing (e.g., vector embedding generation) on the files and objects explicitly selected by storage clients 101, providing computational efficiency and relevance in AI workflows.

Remote storage clusters 123*a*, 123*b*, 123*c* (collectively, remote storage clusters 123) represent additional NetApp clusters geographically or logically separated from local cluster 105. In various implementations, remote storage clusters 123 may participate in data replication workflows. For example, data from remote storage clusters 123 may be mirrored into local cluster 105 via snapshot-based replication technologies, allowing local AI data management nodes 110 to perform in-place processing on remote datasets. Each remote storage cluster 123 may independently manage its own volumes and snapshots, which can be synchronized with local cluster 105 according to defined replication policies.

When data from a remote storage cluster 123 is replicated into local cluster 105, the incoming snapshots are incorporated into aggregated storage 150, where they are treated as native volumes for the purposes of AI data processing. AI data management nodes 110 monitor these volumes using the same snapshot comparison techniques used for locally generated data. Upon receipt of replicated snapshots, AI data management nodes 110 can generate differential snapshots against previously replicated versions to identify new, modified, or deleted data. This enables policy-based vectorization workflows to run on mirrored datasets just as they would on local data, without additional transfers of the mirrored data.

Application 160 is a software application that processes user queries received from user device 190 (and, in some implementations, storage clients 101). Application 160 may be implemented as a standalone software service or a cloud-based application. Upon receiving a user query, application 160 retrieves relevant vector embeddings and associated data from AI data management nodes 110 and generates a prompt for GAI model 180. The prompt includes the original user query along with retrieved contextual data from volumes 151 to improve AI-generated responses. Application 160 submits the prompt to GAI model 180, receives the generated response, and delivers the results to user device 190 or storage client 101, depending on the implementation.

User device 190 is representative of a computing device that submits queries to application 160 and receives AI-generated responses. In various implementations, user device 190 may be a desktop computer, laptop, mobile device, tablet, and the like. User device 190 may interface with application 160 via a web-based interface, API, chatbot, voice assistant, or other interactive platform to facilitate AI-driven interactions. User device 190 may be represented by computing device 705 of FIG. 7.

GAI model 180 is representative of a model such as a large language model (LLM) or a multi-model model (MMM) that obtains queries and generates responses based on the queries. GAI models (also sometimes known as foundation models) are models trained to generate new data based on a training dataset. GAI models as used herein include large-scale generative AI models trained on massive quantities of diverse, unlabeled data. The GAI models learn using self-supervised, semi-supervised, or unsupervised techniques. GAI models perform many downstream tasks based on capturing general knowledge, semantic representations, and patterns and regularities in the training data. In some embodiments, such as embodiments included herein, a GAI model may be fine-tuned for specific downstream tasks. GAI models include BERT (Bidirectional Encoder Representations from Transformers) and ResNet (Residual Neural Network). GAI models may be based on any relevant architecture, including, for example, generative adversarial networks (GANs), variational auto-encoders (VAEs), and transformer models, including multimodal transformer models. Depending on the type of input accepted and output provided, GAI models may be multimodal or unimodal.

Multimodal models are a class of GAI model that accepts multimodal data including text, image, video, and audio data. Multimodal models may leverage techniques like attention mechanisms and shared encoders to fuse information from different modalities and create joint representations. Learning joint representations across different modalities enables multimodal models to generate multimodal outputs that are coherent, diverse, expressive, and contextually rich. For example, multimodal models can generate a caption or textual description of a given image by extracting visual features using an image encoder, then feeding the visual features to a language decoder to generate a descriptive caption. Similarly, multimodal models can generate an image based on a text description (or, in some scenarios, a spoken description transcribed by a speech-to-text engine). Multimodal models work in a similar fashion with video-generating a text description of the video or generating video based on a text description.

Multimodal models include visual-language foundation models, such as CLIP (Contrastive Language-Image Pre-training), ALIGN (A Large-scale ImaGe and Noisy-text embedding), and ViLBERT (Visual-and-Language BERT), for computer vision tasks. Examples of visual multimodal or foundation models include DALL-E, DALL-E 2, Flamingo, Florence, and NOOR. Types of multimodal models may be broadly classified as or include cross-modal models, multi-modal fusion models, and audio-visual models, depending on the particular characteristics or usage of the model.

LLMs are a type of GAI model that process and generate natural language text. These models are trained on massive amounts of textual data. LLMs learn to generate relevant responses given a prompt or input text. The responses are coherent and contextually relevant to the given prompt. LLMs understand and generate sophisticated language based on their training. LLMs capture intricate patterns, semantics, and contextual dependencies in textual data. In some cases, LLMs may be used in multimodel models. For example, LLM intelligence is used to combine images and audio input with textual input to generate multimodal output. Types of LLMs include language generation models, language understanding models, and transformer models.

Transformer models, including transformer-type foundation models and transformer-type LLMs, are a class of deep learning models used in natural language processing (NLP). Transformer models are based on a neural network architecture which uses self-attention mechanisms to process input data and capture contextual relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformer) models, ERNIE (Enhanced Representation through kNowledge Integration) models, T5 (Text-to-Text Transfer Transformer), and XLNet models are types of transformer models which have been pretrained on large amounts of text data using a self-supervised learning technique called masked language modeling. For example, large language models, such as ChatGPT and its brethren, have been pretrained on an immense amount of data across virtually every domain of the arts and sciences. This pre-training allows the models to learn a rich representation of language that can be fine-tuned for specific NLP tasks, such as text generation, language translation, or sentiment analysis. Moreover, these models have demonstrated emergent capabilities in generating responses that are creative, open-ended, and unpredictable.

Figure 2:
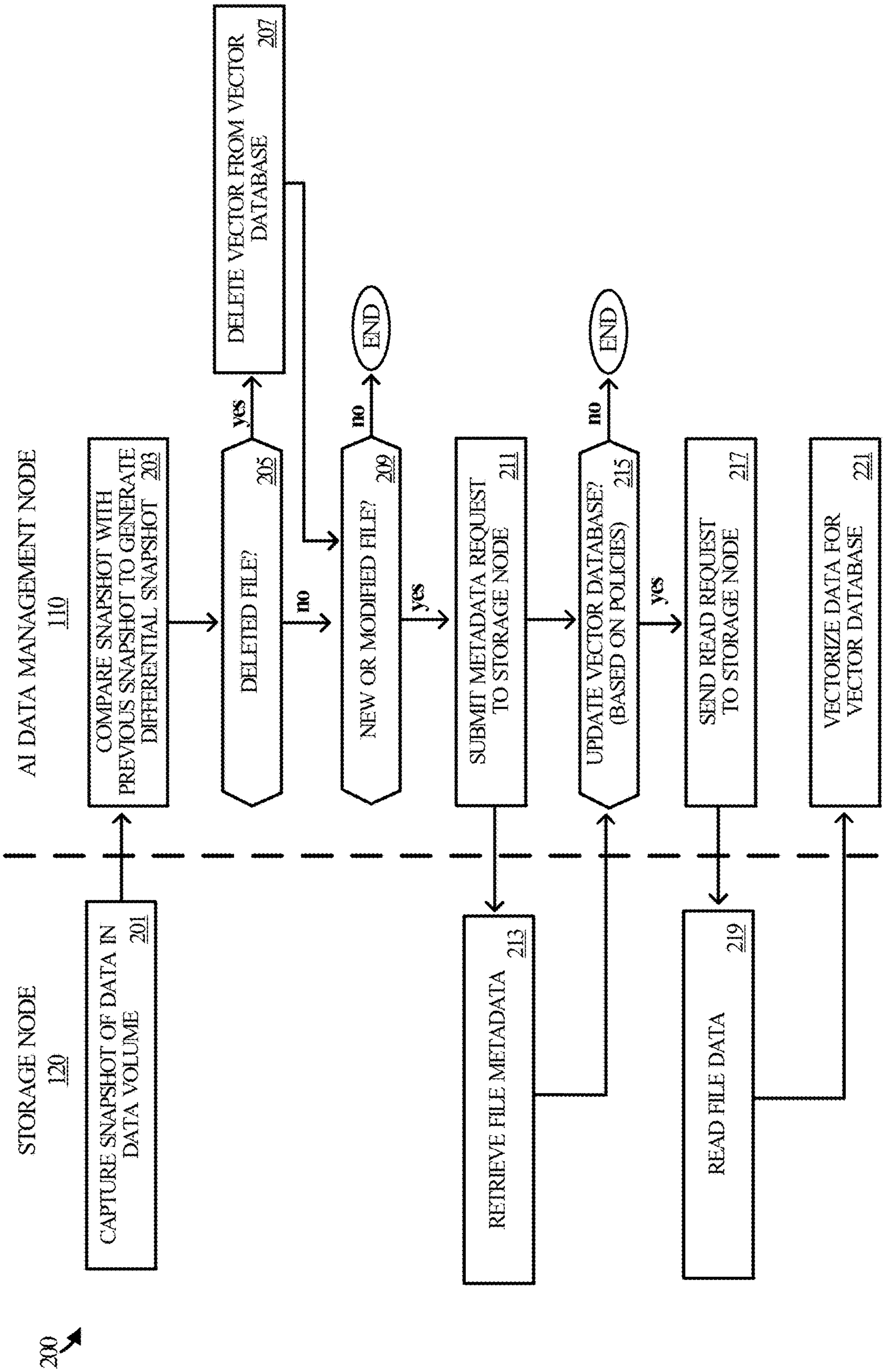
FIG. 2 illustrates a process for updating vector databases in an implementation.

FIG. 2 illustrates a resource management process performed by storage node 120 and AI data management node 110, represented by process 200. Process 200 is employed by one or more computing devices to provide resource management, an example of which is provided by computing device 705 of FIG. 7A. Process 200 may be implemented in program instructions (software and/or firmware) by one or more processors of the computing device. The program instructions direct the computing device to operate as follows, referring parenthetically to the steps in FIG. 2.

Storage node 120 captures a snapshot of data volume 151 within aggregated storage 150 (step 201). Storage node 120 may capture snapshots on a periodic basis (e.g., every 10 minutes, every hour, etc.) or in response to triggering events, according to system configuration or a defined snapshot schedule. Each snapshot represents a point-in-time image of the file system state of data volume 151. Snapshots 310 and 320 are illustrated in FIG. 3 by way of example. Storage node 120 provides each snapshot to AI data management node 110 for use in comparing the current snapshot with one or more previously captured snapshots as part of a differential analysis workflow.

AI data management node 110 compares the current snapshot with a previous snapshot to generate a differential snapshot (step 203). The differential snapshot identifies files that have been added, modified, or deleted in data volume 151. An example differential snapshot is shown as differential snapshot 330 in FIG. 3. While AI data management node 110 is illustrated as generating differential snapshots, it should be noted that in some implementations, storage node 120 may generate the differential snapshots and provide them to AI data management node 110.

AI data management node 110 determines, based on the differential snapshot, whether one or more files have been deleted from data volume 151 (step 205). In particular, AI data management node 110 identifies a file as deleted when the file is present in a previous snapshot but absent from the current snapshot, as indicated by the differential snapshot.

When AI data management determines that a file has been deleted, AI data management node 110 deletes the file from vector database 163 (step 207). Accordingly, AI data management node 110 prevents outdated vectors (i.e., vectors without an associated file or data object) from remaining in vector database 163 after file deletion.

AI data management node 110 determines, based on the differential snapshot, whether one or more files in data volume 151 have been newly created or modified (step 209). If no new or modified files are identified, process 200 ends. It should be noted that steps 205, 207, which address deleted files, may be performed before, after, or concurrently with step 209, depending on implementation-specific considerations or processing order.

If new or modified files are identified, AI data management node 110 submits a metadata request to storage node 120 to obtain descriptive information about those files (step 211). Specifically, metadata is requested for each file identified as new or modified in step 209. An example of the type of metadata retrieved is illustrated in FIG. 3 as metadata 340. In response to the request, storage node 120 retrieves the relevant metadata (step 213) and returns it to AI data management node 110 for further processing. The metadata may include various attributes of each file, such as creation date, owner or group, permissions, and file path, among others, as illustrated by way of example in metadata 340 of FIG. 3.

AI data management node 110 determines whether to update the vector database based on implemented policies (step 215). In particular, AI data management node 110 analyzes the metadata retrieved in step 213 for each new or modified file to evaluate whether that file meets the criteria specified by the applicable policies. These policies may be configured by an administrative user, or by storage clients 101 within local cluster 105, and may include a wide range of filtering rules.

For example, a policy may specify that vector embeddings are generated only for files created after a specified date, in which case AI data management node 110 evaluates the creation date metadata to exclude older files. Another policy may restrict vectorization based on group ownership or data classification (e.g., excluding files labeled as "marketing" while including those categorized under "engineering.") Policies may also reference file path or directory structure, such that only files located within specified folders are eligible for vectorization. It is noted that these options are provided by way of example only; AI data management node 110 may leverage the metadata to perform policy-based filtering based on a wide range of rules defined by system administrators.

In general, administrators may define a variety of metadata-based conditions to control which files are processed, allowing the system to avoid unnecessary vectorization and reduce computational overhead. If none of the new or modified files satisfy the applicable policy criteria, process 200 terminates without updating vector database 163.

When it is determined that vector database 163 should be updated, AI data management node 110 submits a read request to storage node 120 (step 217), requesting the associated new and/or modified files. Storage node 120 retrieves the requested file data from data volume 151 (step 219) and returns it to AI data management node 110. Upon receiving the data, AI data management node 110 generates one or more vector embeddings based on the file contents and updates vector database 163 accordingly (step 221).

Accordingly, process 200 illustrates a flow in which differential snapshots and metadata analysis are used to selectively update a vector database for RAG operations. The integration of AI data processing within data storage clusters provides that only changed files or data objects are retrieved from the aggregated storage for vectorization, reducing overall data transfer and number of copies.

FIG. 3 illustrates a differential snapshot scenario illustrated by scenario 300, which depicts an example of snapshot generation and differential analysis performed by storage node 120 and AI data management node 110 of FIG. 1, respectively.

In scenario 300, storage node 120 captures a first snapshot 310 of a data volume (e.g., data volume 151 of FIG. 1), followed by a second snapshot 320 of the same volume. As shown in FIG. 3, each snapshot includes a set of block-level pointers associated with the files in volume 151. These pointers indicate which blocks in the underlying physical storage (e.g., aggregated storage 150 of FIG. 1) are used to store each file at the time of the snapshot. In some implementations, snapshots may be captured on a periodic basis. In this example, second snapshot 320 represents the next sequential snapshot taken after first snapshot 310. Both snapshots are provided to AI data management node 110 for differential comparison, as described above with respect to steps 201, 203 of process 200. It is noted that, while a small number of block pointers are illustrated in FIG. 3 for clarity, snapshots may reference a large number of block pointers depending on the size of the associated file.

Differential snapshot 330 is generated by AI data management node 110 by comparing first snapshot 310 to second snapshot 320. As shown, File 2 is identified as modified: for example, the pointer to block E has been replaced with a pointer to block E1 (indicating modified content), and a new pointer to block J has been added (indicating additional content). File 3 is identified as deleted because it appears in snapshot 310 but is absent from snapshot 320. File 4 is identified as added because it appears in snapshot 320 but not in snapshot 310. File 1, whose block pointers remain unchanged across both snapshots, is not included in differential snapshot 330.

In this context, a block pointer refers to a reference used by storage node 120 to identify a physical or logical storage block on disk that contains file data. Each file may include one or more block pointers, which collectively map the file's logical structure to specific locations in the underlying storage medium. When a file is modified, new data blocks may be allocated and associated with the file by updating its set of block pointers. Because snapshots capture the block-pointer state of each file at a given time, comparing snapshots (i.e., generating differential snapshots) provides for identification of changes based on additions, removals, or substitutions of these pointers.

Retrieved metadata 340 refers to the metadata obtained by AI data management node 110 for files identified as modified or added in differential snapshot 330. This metadata is used by AI data management node 110 to evaluate whether to update vector database 163, as described above in relation to step 215 of process 200. FIG. 3 illustrates exemplary metadata fields that may be retrieved for each applicable file, including, for example: file size, creation date, last modification date, file path, data category, associated user or group, permissions, and file type. These attributes are provided by way of example only; additional or different attributes may also be included depending on the implementation. AI data management node 110 leverages this metadata to apply policy-based filtering logic, selectively determining which files to vectorize and incorporate into vector database 163.

FIG. 4 illustrates an operation sequence in the context of data environment 100 in an implementation, represented by sequence 400. Sequence 400 includes GAI model 180, application 160, storage client 101, storage node 120, aggregated storage 150, AI data management node 110, and vector database 163.

In sequence 400, storage client 101 provides write requests to storage node 120. Storage node 120 forwards the write requests to aggregated storage 150 to write to a volume (such as volume 151 of FIG. 1). Storage node 120 generates a snapshot of aggregated storage 150 and provides the snapshot to AI data management node 110. AI data management node 110 generates a differential snapshot based on a comparison of the snapshot with a previous snapshot. AI data management node 110 processes the differential snapshot and updates vector database 163 based on the processed differential snapshot. This update may include updating an existing vector embedding in vector database 163, adding a new vector to vector database 163, or deleting a vector from vector database 163, as discussed above.

Storage client 101 submits a user text query to application 160. (It is noted that in various implementations, other or additional entities may submit user text queries to application 160, such as user device 190 of FIG. 1. Application 160 forwards the user text query to AI data management node 110 for retrieval augmented generation. AI data management node 110 performs a similarity search in vector database 163 to identify vector embeddings relevant to the user query. This similarity search involves generating a vector embedding of the user text query and executing a nearest neighbor search (e.g., k-nearest neighbors (KNN), approximate nearest neighbor (ANN), cosine similarity or other vector similarity techniques) within vector database 163. The system retrieves the most relevant embeddings based on vector distances, ensuring that the RAG pipeline retrieves contextually appropriate information for AI inferencing. AI data management node 110 obtains the selected vectors from the vector database and identifies data objects of aggregated storage 150. These data objects may be files or data chunks in various implementations. AI data management node submits a request for the data objects to storage node 120. Storage node 120 reads the data objects from aggregated storage and provides the data objects to AI data management node 110. AI data management node 110 forwards the data objects to application 160.

Application 160 generates a prompt for GAI model 180 that includes the retrieved data objects as well as the user text query. Application 160 submits the prompt to GAI model 180. GAI model 180 generates a response and returns the response to application 160. Application then forwards the response to storage client 101 or the user submitting the prompt.

Figure 5:
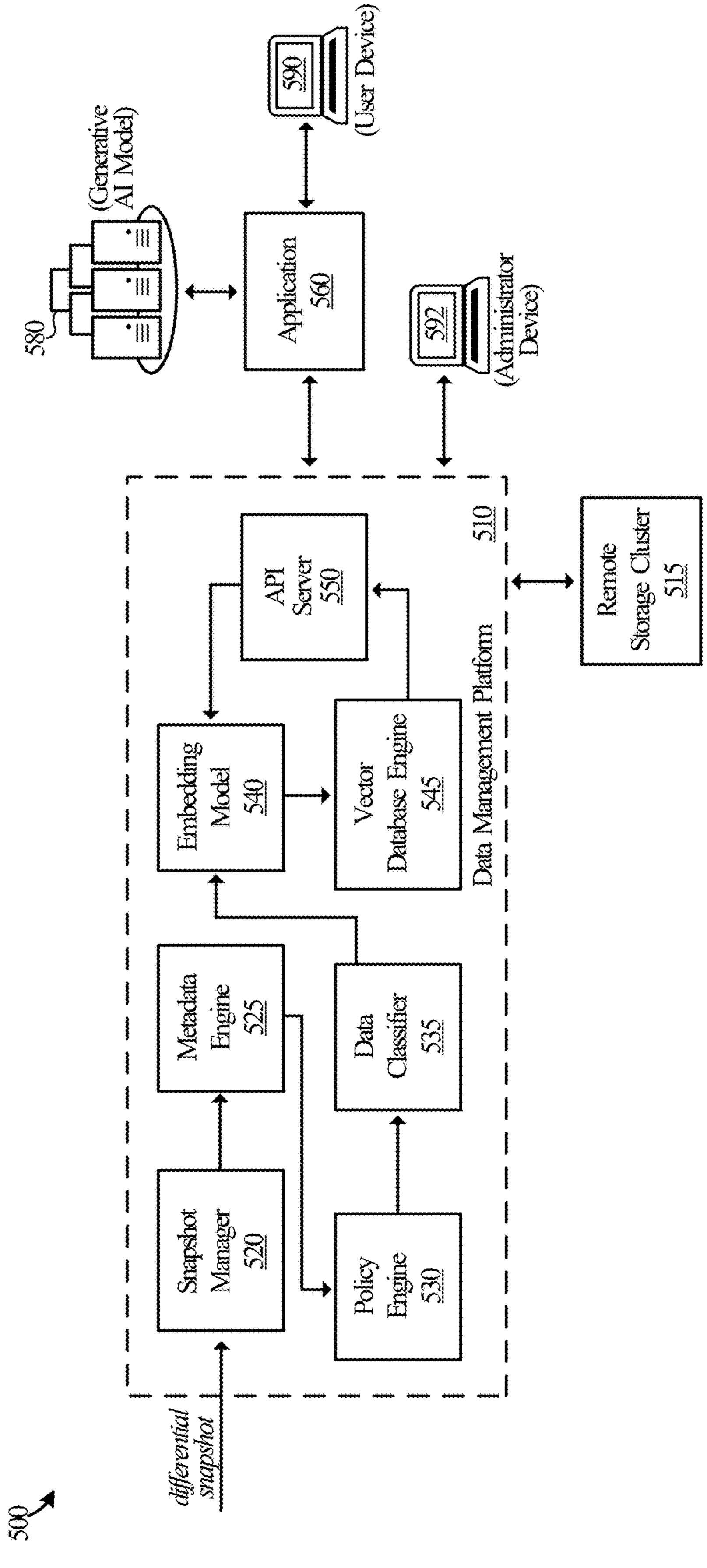
FIG. 5 illustrates an AI data environment in an implementation.

FIG. 5 illustrates AI data environment 500 in an implementation. AI data environment 500 includes data management platform 510, application 560, GAI model 580, user device 590, administrator device 592, and remote storage cluster 515.

Data management platform 510 represents a platform for making data AI ready. Data management platform 510 may be implemented in an AI data management node, such as AI data management node 110 of FIG. 1. Data management platform 510 performs AI data processing functions for data in a customer's storage, such as aggregated storage 150 of FIG. 1.

Data management platform 510 includes snapshot manager 520, metadata engine 525, policy engine 530, data classifier 535, embedding model 540, vector database engine 545, and API server 550.

Snapshot manager 520 is configured to obtain incoming snapshots, which may be periodically generated by a storage controller, such as storage node 120 of FIG. 1. Snapshot manager 520 generates differential snapshots based on the snapshots obtained by the storage node, which identify new, modified, or deleted files or data objects. Upon generating a differential snapshot, snapshot manager 520 forwards the differential snapshot to metadata engine 525 for further processing.

Metadata engine 525 processes differential snapshots by identifying each new or modified file and retrieving its associated metadata. This metadata (as illustrated by way of example in retrieved metadata 340 of FIG. 3) may include attributes such as creation date, modification timestamp, file path, ownership, file size, access permissions, and data classification.

Metadata engine 525 maintains an index representing the customer's entire data estate, including data from both local and replicated volumes. This metadata index provides a current, consolidated view of all known files, datasets, and storage attributes in aggregated storage (e.g., aggregated storage 150 of FIG. 1). The metadata index may support the generation of a data catalog, such as data catalog 175 of FIG. 1.

When a new snapshot is received, metadata engine 525 updates the metadata index incrementally based on the delta identified in the differential snapshot. This approach allows metadata engine 525 to efficiently maintain an up-to-date representation of the data estate without re-scanning or re-indexing the full aggregated storage. In addition, metadata engine 525 supports a publishing mechanism by which delta metadata updates are distributed to subscribed services or users.

Policy engine 530 is representative of a service that determines whether to generate updated vector embeddings based on the retrieved metadata. Policy engine 530 determines whether specific files identified in the differential snapshot should proceed to vectorization. This decision is based on policies that may be defined by an administrator using administrator device 592. Policy engine 530 evaluates the retrieved metadata against these policies (examples of which are discussed above in relation to step 215 of process 200) and triggers downstream processing only for data that meets the configured policies.

For each file selected for vectorization, policy engine 530 retrieves the corresponding file or object content from aggregated storage. Because selection is metadata-driven, excessive data movement is avoided, and compute resources are conserved by processing only the differential, policy-relevant dataset.

Once the data files or objects are obtained, policy engine 530 may apply redaction and data masking policies by automatically removing or obfuscating sensitive information such as personally identifiable information (PII), protected health information (PHI), and confidential business data before AI processing. Policy engine 530 can also filter out profanity or sensitive corporate data to prevent unauthorized exposure in RAG applications. Additionally, policy engine 530 may enforce access restrictions to provide that vector embeddings are not generated or retrieved for restricted files or data objects in aggregated storage.

Data classifier 535 is representative of a service for applying classifications to the differential data. Data classifier 535 may apply a variety of classification schemes based on predefined policies, machine learning models, or rule-based heuristics. These classifications can include content-based tags (e.g., "financial data," "customer records," "legal documents," etc.), security labels (e.g., "confidential," "restricted," "public"). Data classifier 535 may leverage natural language processing (NLP), pattern recognition, or metadata analysis to extract insights from unstructured and structured data.

Embedding model 540 is a service for converting structured and unstructured data into vector embeddings for the vector database. Embedding model 540 processes the classified and redacted differential data and generates corresponding vector embeddings, providing that the vector database 163 remains up to date with the latest modifications to data stored in aggregated storage 150. Embedding model 540 may leverage machine learning (ML) techniques, deep learning models, or pre-trained transformers to encode text, images, numerical data, or multimodal inputs into vector representations.

Vector database engine 545 is a service for storing, indexing, and managing vector embeddings generated by embedding model 540. Vector database engine 545 maintains the vector database (such as vector database 163 of FIG. 1), providing that vector embeddings are persistently stored and remain available for retrieval-augmented generation.

API server 550 is an interface between application 560 and AI data management nodes (e.g., AI data management node 110 of FIG. 1). When application 560 submits a user text query, API server 550 routes the query to embedding model 540, where it is converted into a vector embedding for similarity-based retrieval.

Once the vector embedding is generated, API server 550 initiates a similarity search in vector database 163 via vector database engine 545, identifying relevant vector embeddings and their corresponding data objects stored in aggregated storage 150. The retrieved data is then sent back to application 560, where it is used for prompt generation in retrieval-augmented generation workflows.

Application 560 may be substantially similar to application 160 described above in relation to FIG. 1. User device 590 may be substantially similar to user device 190 described above with respect to FIG. 1. GAI model 580 may be substantially similar to GAI model 180 described above with respect to FIG. 1.

Administrator device 592 is representative of a computing device used by administrative personnel to configure policy engine 530 and other control logic within data management platform 510. Using administrator device 592, an administrator may define, update, and manage vectorization policies, access restrictions, content redaction rules, and classification schemes. These policies determine how data is handled by metadata engine 525, data classifier 535, and embedding model 540, providing AI workflows remain compliant with organizational governance frameworks.

Remote storage cluster 515 is representative of a geographically or logically distinct storage environment that replicates data into the local infrastructure. Snapshots from remote storage cluster 515 may be synchronized into local aggregated storage using snapshot-based replication protocols. These snapshots are treated as native volumes by data management platform 510, enabling AI workflows (including policy application, vector embedding, and retrieval) without additional data transfers.

Figure 6A:
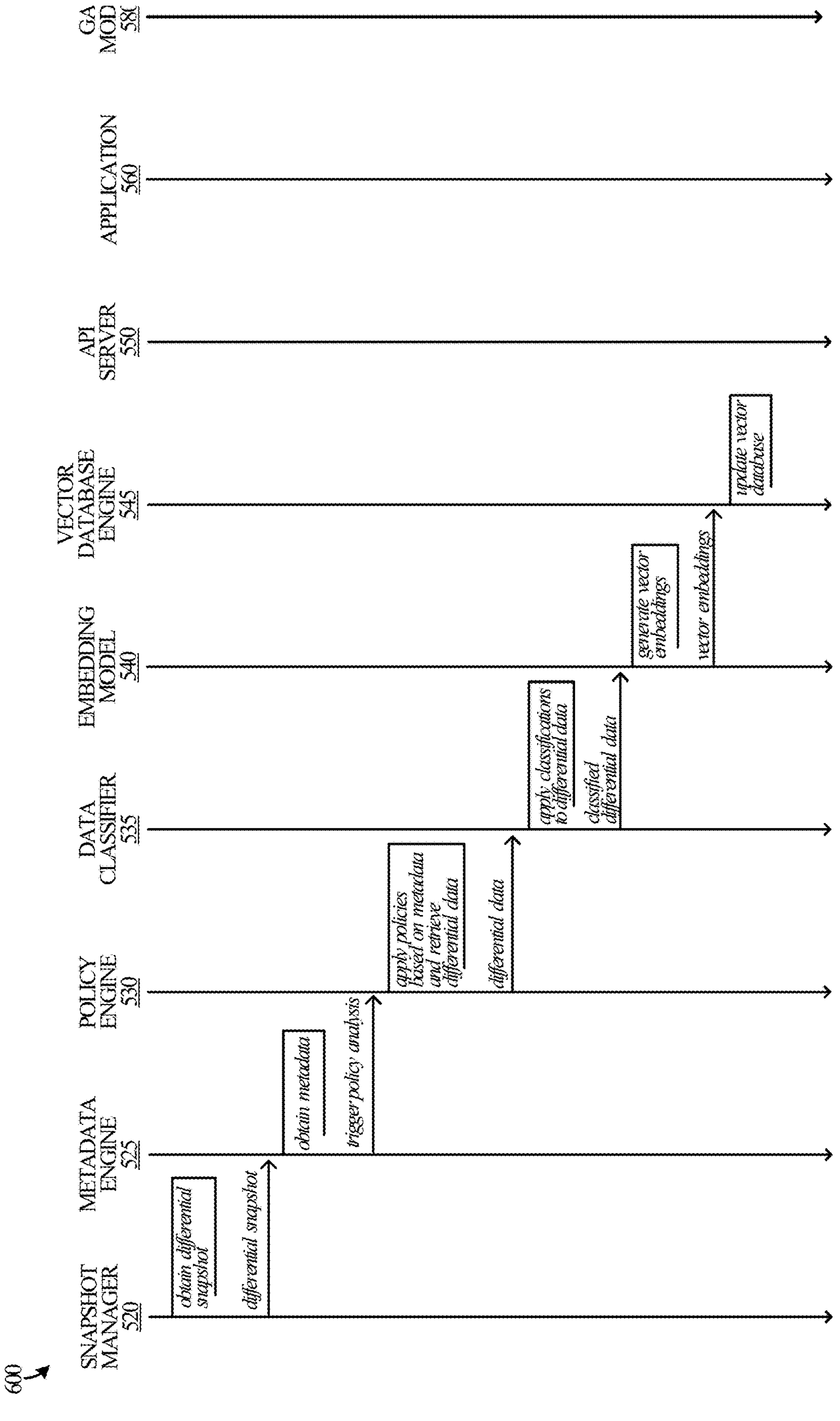

FIGS. 6A and 6B illustrate an operation sequence in the context of AI data environment 500 in an implementation, represented by sequence 600. Sequence 600 includes snapshot manager 520, metadata engine 525, policy engine 530, data classifier 535, embedding model 540, vector database engine 545, API server 550 application 560, and GAI model 580.

In sequence 600, snapshot manager 520 obtains a differential snapshot and provides the differential snapshot to metadata engine 525. Metadata engine 525 obtains metadata from the differential snapshot and triggers processing of the differential snapshot. Policy engine 530 analyzes the metadata retrieved by metadata engine 525 and applies defined policies to determine whether to proceed with RAG processing for the associated files or data objects. Policy engine 530 obtains the files and objects that comply with the policies and provides the data to data classifier 535. Data classifier 535 applies classifications to the differential data (as discussed above with respect to FIG. 5) and provides the classified differential data to embedding model 540. Embedding model 540 generates vector embeddings for the differential data and provides the vector embeddings to vector database engine 545. Vector database engine 545 updates a vector database (such as vector database 163 of FIG. 1) with the vector embeddings, by updating existing vector embeddings in the vector database and/or adding new vectors to the vector database.

Continuing with sequence 600 in FIG. 6B, application 560 obtains user query text from a user, such as a user on user device 590 of FIG. 5. Application 560 forwards the user query text to API server 550. API server 550 forwards the user query text to embedding model 540. Embedding model 540 vectorizes the user query and provides a similarity search request from vector database engine 545. Vector database engine 545 retrieves similar vector embeddings from vector database based on a nearest-neighbor search and returns the retrieved vector embeddings to embedding model 540. Embedding model 540 retrieves the data objects associated with the vector embeddings from aggregated storage (such as aggregated storage 150 of FIG. 1) and provides the retrieved data objects to API server 550. API server 550 forwards the data objects to application 560, which in turn generates a prompt for GAI model 580 including the user query and the retrieved data objects. Application 560 submits the prompt to GAI model 580. GAI model 580 generates a response and returns the response to application 560. Application then forwards the response to the user submitting the prompt (e.g., to user device 590 of FIG. 5).

Figure 7A:
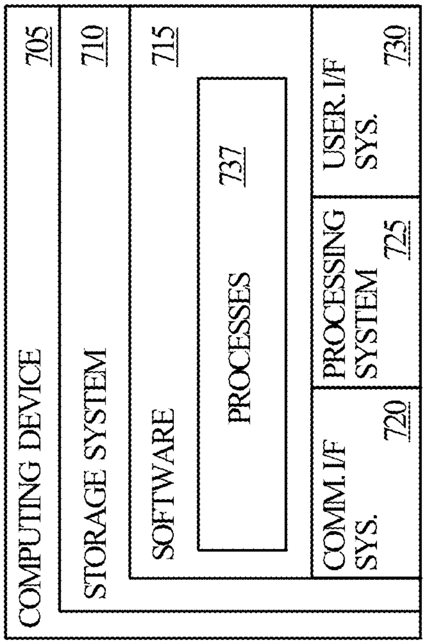
FIG. 7A illustrates a computing system suitable for implementing the various operational environments, architectures, environments, processes, scenarios, sequences, and frameworks discussed below with respect to the other Figures.

FIG. 7A illustrates computing device 705, which is representative of any system or collection of systems in which the various applications, processes, services, and scenarios disclosed herein may be implemented. Examples of computing apparatus illustrated by computing device 705 include, but are not limited to server computers, web servers, cloud computing platforms, and data center equipment, as well as any other type of physical or virtual server machine, container, and any variation or combination thereof. In some examples, computing device 705 may also be representative of desktop and laptop computers, tablet computers, and the like.

Computing device 705 may be implemented as a single apparatus, system, or device or may be implemented in a distributed manner as multiple apparatuses, systems, or devices. Computing device 705 includes, but is not limited to, processing system 725, storage system 710, software 715, communication interface system 720, and user interface system 730. Processing system 725 is operatively coupled with storage system 710, communication interface system 720, and user interface system 730.

Processing system 725 loads and executes software 715 from storage system 710. Software 715 includes and implements processes 737, which are representative of the processes discussed with respect to the preceding Figures. When executed by processing system 725, software 715 directs processing system 725 to operate as described herein for at least the various processes, operational scenarios, and sequences discussed in the foregoing implementations. Computing device 705 may optionally include additional devices, features, or functionality not discussed for purposes of brevity.

Referring still to FIG. 7A, processing system 725 may include a micro-processor and other circuitry that retrieves and executes software 715 from storage system 710. Processing system 725 may be implemented within a single processing device but may also be distributed across multiple processing devices or sub-systems that cooperate in executing program instructions. Examples of processing system 725 include general purpose central processing units, microcontroller units, graphical processing units, application specific processors, integrated circuits, application specific integrated circuits, and logic devices, as well as any other type of processing device, combinations, or variations thereof.

Storage system 710 may comprise any computer readable storage media readable by processing system 725 and capable of storing software 715. Storage system 710 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. The computer readable storage media described here refers to non-transitory media. Storage system 710 may be implemented as a single storage device but may also be implemented across multiple storage devices or sub-systems co-located or distributed relative to each other. Storage system 710 may comprise additional elements, such as a controller, capable of communicating with processing system 725 or possibly other systems.

Software 715 may be implemented in program instructions that, when executed by processing system 725, direct processing system 725 to operate as described with respect to the various operational scenarios, sequences, and processes illustrated herein. In particular, processes 737 may be implemented in program instructions, that, when executed by processing system 735, direct processing system 735 to perform the functions of AI Data management nodes 110*a*, 110*b*, 110*c* of FIG. 1 and data management platform 510 of FIG. 5, and perform processes described herein such as process 200 of FIG. 2. Further, storage operating system 735 (discussed in FIG. 7B) may be implemented in program instructions that, when executed by processing system 725, direct processing system 725 to perform the functions of storage nodes 120*a*, 120*b*, 120*c* of FIG. 1 and processes described herein such as process 200 of FIG. 2.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 715 may include additional processes, programs, or components, such as operating system software, virtualization software, or other application software. Software 715 may also comprise firmware or some other form of machine-readable processing instructions executable by processing system 725.

In general, software 715, when loaded into processing system 725 and executed, transforms a suitable apparatus, system, or device (of which computing device 705 is representative) overall from a general-purpose computing system into a special-purpose computing system customized to support AI data management processes and/or storage processes as described herein. Indeed, encoding software 715 on storage system 710 may transform the physical structure of storage system 710. The specific transformation of the physical structure may depend on various factors in different implementations of this description. Examples of such factors may include, but are not limited to, the technology used to implement the storage media of storage system 710 and whether the computer-storage media are characterized as primary or secondary storage, as well as other factors.

For example, if the computer readable storage media are implemented as semiconductor-based memory, software 715 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 720 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 705 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Figure 7B:
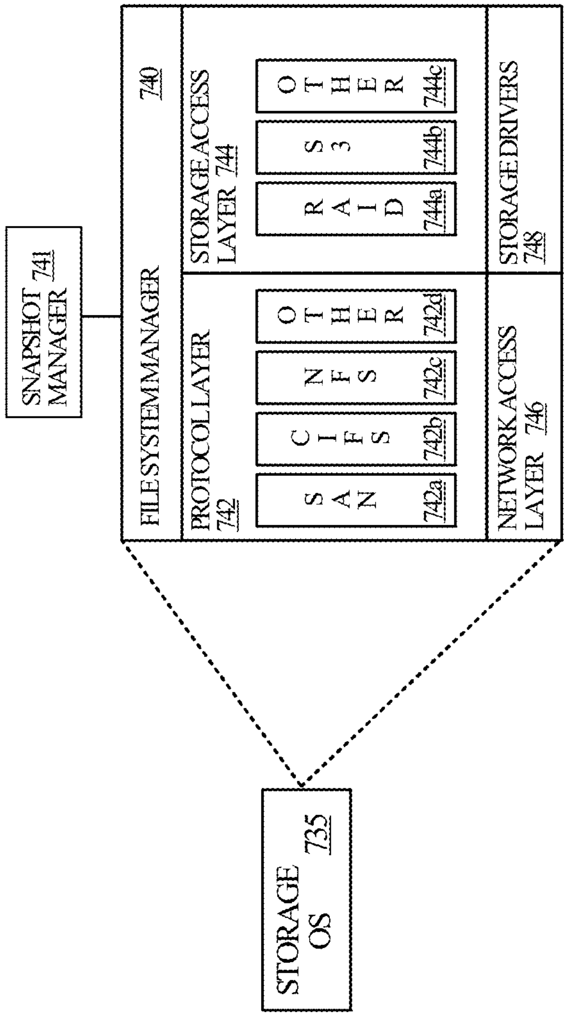
FIG. 7B illustrates a storage operating system in an implementation.

FIG. 7B illustrates storage operating system 735, which is representative of software that may be loaded on and executed by computing device 705. In one example, storage operating system 735 may include several modules, or "layers" executed by one or both of a network module and a storage module. These layers include a file system manager 740 that keeps track of a hierarchical structure of the stored data and manages read/write operation, i.e., executes read/write operation on storage in response to I/O requests, as described above in detail. In some cases, file system manager 740 interfaces with a failover module during a failover operation to enable access to storage managed by a failed storage system node via a partner storage system node.

Storage operating system 735 may also include a protocol layer 742 and an associated network access layer 746, to allow storage nodes to communicate over a network with other systems, such as storage clients 101 of FIG. 1. Protocol layer 742 may implement one or more of various higher-level network protocols, such as SAN (e.g., iSCSI) (742*a*), CIFS (742*b*), NFS (742*c*), Hypertext Transfer Protocol (HTTP) (not shown), TCP/IP (not shown) and others (742*d*).

Network access layer 746 may include one or more drivers, which implement one or more lower-level protocols to communicate over the network, such as Ethernet. Interactions between host systems and mass storage devices are illustrated schematically as a path, which illustrates the flow of data through storage operating system 735.

The storage operating system 735 may also include a storage access layer 744 and an associated storage driver layer 748 to allow a storage controller to communicate with a storage device. The storage access layer 744 may implement a higher-level storage protocol, such as RAID (744*a*), a S3 layer 744*b* to access a capacity tier for object-based storage (not shown), and other layers 744*c*. In particular, process 200 is representative of at least a portion of an execution of S3 layer 744*b* by processing system 725. The storage driver layer 748 may implement a lower-level storage device access protocol, such as Fibre Channel or SCSI. The storage driver layer 748 may maintain various data structures (not shown) for storing information regarding storage volume, aggregate and various storage devices. Snapshot manager 741 is representative of a component of storage operating system 735 that manages snapshot operations, including scheduling snapshots, identifying differential data, and generating differential snapshots of data.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data management system comprising:
aggregated storage comprising a volume;
a storage node configured to:
read and write data to the volume, and
generate a snapshot of the volume; and
an artificial intelligence (AI) data management node configured to:
obtain the snapshot from the storage node,
generate a differential snapshot based on the snapshot and a previous snapshot of the volume, wherein the differential snapshot identifies changed data in the volume, and wherein the identified changed data comprises at least an identification of a new or modified data object in the volume,
evaluate metadata associated with the new or modified data object to obtain a determination that the new or modified data object satisfies one or more policies, and
in response to the determination, process the differential snapshot to update a vector database for retrieval augmented generation, wherein updating the vector database comprises generating a vector embedding for the new or modified data object captured in the differential snapshot.

2. The system of claim 1, wherein:
the AI data management node is disposed in a same local cluster as the storage node, such that the AI data management node enforces same access controls and security policies as the storage node, and
the AI data management node is further configured to:
submit, in response to identifying the new or modified data object, a request to the storage node for the metadata associated with the new or modified data object, and
obtain, from the storage node, the metadata associated with the new or modified data object to perform the evaluation of the metadata.

3. The system of claim 2, wherein the AI data management node is further configured to:
determine, based on the differential snapshot, to modify an existing vector associated with the modified data object, and
update the vector database by modifying the existing vector.

4. The system of claim 2, wherein the AI data management node is further configured to:
determine, based on the differential snapshot, to add a new vector associated with the new data object to the vector database, and
add the new vector to the vector database.

5. The system of claim 1, wherein determining that the new or modified data object satisfies one or more policies comprises:
determining, based on a creation date identified in the metadata, that the new or modified data object satisfies a date-based policy that filters data objects for vectorization based on creation date.

6. The system of claim 1, wherein determining that the new or modified data object satisfies one or more policies comprises:

determining, based on a group ownership identified in the metadata, that the new or modified data object satisfies an ownership policy that filters data objects for vectorization based on group ownership.

7. The system of claim 1, wherein determining that the new or modified data object satisfies one or more policies comprises:

determining, based on a classification identified in the metadata, that the new or modified data object satisfies a classification policy that filters data objects for vectorization based on classification.

8. The system of claim 1, wherein determining that the new or modified data object satisfies one or more policies comprises:

determining, based on a file path identified in the metadata, that the new or modified data object satisfies a directory-based policy that filters data objects for vectorization based on file path.

9. A computer-implemented method comprising, by an artificial intelligence (AI) data management node:

maintaining a vector database comprising vector embeddings of data stored in one or more storage devices using a volume by a storage node of a storage system;

generating a differential snapshot based on snapshots obtained from the storage node, wherein the differential snapshot identifies changed data in the volume, and wherein the identified changed data comprises at least an identification of a new or modified data object in the volume;

evaluating metadata associated with the new or modified data object to obtain a determination that the new or modified data object satisfies one or more policies; and in response to the determination, vectorizing the changed data to update a vector database for retrieval augmented generation, wherein updating the vector database comprises generating a vector embedding for the new or modified data object captured in the differential snapshot.

10. The computer-implemented method of claim 9, the AI data management node is disposed in a same local cluster as the AI data management node, such that the AI data management node enforces same access controls and security policies as the storage node, and the method further comprises, by the AI data management node:

submitting, in response to identifying the new or modified data object, a request to the storage node for the metadata associated with the new or modified data object, and obtaining, from the storage node, the metadata associated with the new or modified data object to perform the evaluation of the metadata.

11. The computer-implemented method of claim 9, wherein determining that the new or modified data object satisfies one or more policies comprises:

determining, based on a group ownership identified in the metadata, that the new or modified data object satisfies an ownership policy that filters data objects for vectorization based on group ownership.

12. The computer-implemented method of claim 9, wherein determining that the new or modified data object satisfies one or more policies comprises:

determining, based on a classification identified in the metadata, that the new or modified data object satisfies a classification policy that filters data objects for vectorization based on classification.

13. The computer-implemented method of claim 9, wherein determining that the new or modified data object satisfies one or more policies comprises:

determining, based on a file path identified in the metadata, that the new or modified data object satisfies a directory-based policy that filters data objects for vectorization based on file path.

14. The computer-implemented method of claim 10, further comprising:

generating a data catalog identifying data in the storage system available for AI processing; and receiving a selection, from a client system, of a dataset from the data catalog for AI processing, wherein the vectorizing the changed data is selectively performed for the selected dataset.

15. The computer-implemented method of claim 10, further comprising, prior to vectorizing the changed data:

applying one or more policies to the changed data; and classifying the changed data.

16. A computer-readable storage media device having program instructions stored thereon that, upon execution by one or more processors, cause the one or more processors to:

maintain a vector database comprising vector embeddings of data in a volume of aggregated storage;

obtain a differential snapshot from a storage node, wherein the differential snapshot identifies changed data in the volume, the changed data comprising one or more of: new data objects or modified data objects;

evaluate metadata associated with the changed data to identify a set of data objects in the changed data that satisfy one or more policies; and vectorize the set of identified data objects to update a vector database for retrieval augmented generation.

17. The computer-readable storage media device of claim 16, wherein identifying the set of data objects comprises: filtering the changed data based on an ownership policy that filters data objects for vectorization based on group ownership.

18. The computer-readable storage media device of claim 16 wherein identifying the set of data objects comprises: filtering the changed data based on a classification policy that filters data objects for vectorization based on classification.

19. The computer-readable storage media device of claim 16, wherein identifying the set of data objects comprises: filtering the changed data based on a directory-based policy that filters data objects for vectorization based on file path.

20. The computer-readable storage media device of claim 16, wherein the program instructions comprise further program instructions that, upon execution by the one or more processors, cause the one or more processors to, prior to vectorizing the changed data:

apply security policies to the changed data; and classify the changed data.

* * * * *